United States Patent [19]

Stolzlechner

[11] 4,078,751

[45] Mar. 14, 1978

[54] VIBRATION-ELIMINATING SUPPORT FOR INDICATING INSTRUMENT

[75] Inventor: Albert Stolzlechner, Rembrucken, Germany

[73] Assignee: VDO Adolf Schindling AG, Frankfurt am Main, Germany

[21] Appl. No.: 675,775

[22] Filed: Apr. 12, 1976

[30] Foreign Application Priority Data

Apr. 25, 1975 Germany .............................. 132579

[51] Int. Cl.² ...................... F16F 15/08; G01D 11/10
[52] U.S. Cl. ...................................... 248/15; 73/430; 73/493
[58] Field of Search ............. 73/430, 493, 496, 432 A; 248/15, 22

[56] References Cited

U.S. PATENT DOCUMENTS

| 2,089,383 | 8/1937 | Koerner | 248/22 X |
| 2,631,690 | 3/1953 | Dunham | 73/430 X |
| 2,670,914 | 3/1954 | Jones | 248/15 X |
| 2,915,304 | 12/1959 | Köhler | 73/493 X |
| 3,146,978 | 9/1964 | Carlson | 248/15 |
| 3,773,285 | 11/1973 | Morrill | 248/15 |

FOREIGN PATENT DOCUMENTS 853,878  11/1960  United Kingdom .................. 248/15

*Primary Examiner*—Richard C. Queisser
*Assistant Examiner*—John S. Appleman
*Attorney, Agent, or Firm*—Otto John Munz

[57] ABSTRACT

A vibration-eliminating indicating instrument support for vibrating and shock-sustaining bodies, such as vehicles, particularly motorcycles, in a housing closed by an inspection glass, contains the measuring mechanism with an instrument dial and a hand, a holding cup for the housing, a base fastened to the holding cup and a vibration insulator interposed between the base and the cup.

The vibration insulator is of elastic-rubber material of a Shore-hardness between 50 and 70 and is provided with a base-fastening bearing surface and a thread.

The ring is fixedly attached to the cup in the peripheral area opposite the bearing surface radially.

10 Claims, 2 Drawing Figures

VIBRATION-ELIMINATING SUPPORT FOR INDICATING INSTRUMENT

CROSS-REFERENCE TO A RELATED APPLICATION

Priority of corresponding German application No. G 75 13 257 filed Apr. 24, 1975 is claimed under the Convention.

FIELD OF THE INVENTION

An indicating instrument for motor vehicles, particularly motorcycles, with a casing closed by an inspection glass and containing the measuring mechanism with the instrument dial and the hand, and with a holding device which comprises a holding cup for the casing and a base fastened to the said holding cup.

DESCRIPTION OF THE PRIOR ART

The known indicating instruments of this type are designed for auxiliary non-custom installation in an operating vehicle for the special purpose of indicating additional operating data, such as rotational speed, oil temperature and the like, which are not indicated by the conventional indicating instruments.

The indicating instruments operate satisfactorily and furnish exact data when they are fixed on a part of a vehicle not subject to vibrations or subject only to small vibrations, as for instance on dashboards of passenger cars. When, however, the indicating instruments are fixed on a vehicle part subject to strong vibrations and shocks, such as on the guide rod of a motorcycle, a sled, or a similar motor vehicle, an accurate reading of the measured values is no longer possible because of the strong quivering of the hand. Attempts to eliminate, or to reduce the quivering of the hand by a suitable damping of the movable portions of the measuring mechanism have been unsuccessful.

SUMMARY OF THE INVENTION

The objects of the invention are:

to provide an indicating instrument such as one with a dial and a hand moving over it, the instrument to be attached to a vibrating body, such as a vehicle, a machine, a recording instrument and similar, which:

eliminates transfer of vibrations and shocks from the body to which it is to be attached to the moving hand and avoids its quivering;

permits an unobjectionable reading of the values indicated, during the vibrations of the body;

permits large scale construction of the instrument, with inexpensive and simple assembly, attachment to a vibrating body and repairs, and does not negatively affect the esthetic appearance of the instrument, but improves it.

Other objects and advantages of the invention will become apparent to those skilled in the art on hand of the following description, claims and drawings.

DESCRIPTION OF THE PREFERRED EMBODIMENTS

Figure 1:
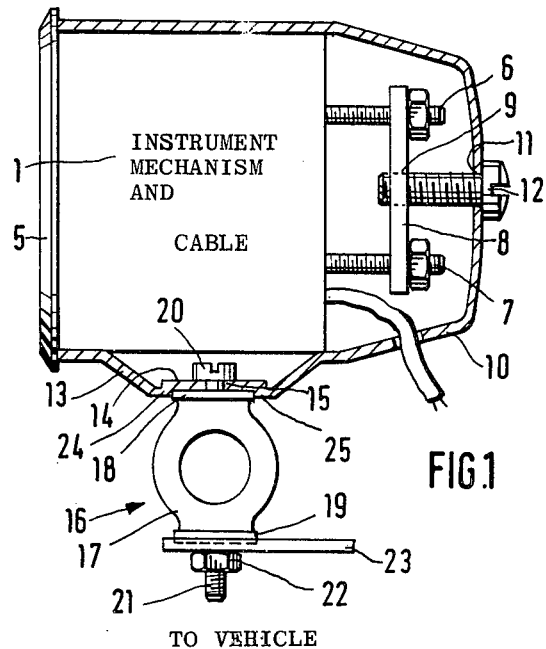
FIG. 1, illustrates a longitudinal section through the indicating instrument.
Figure 2:
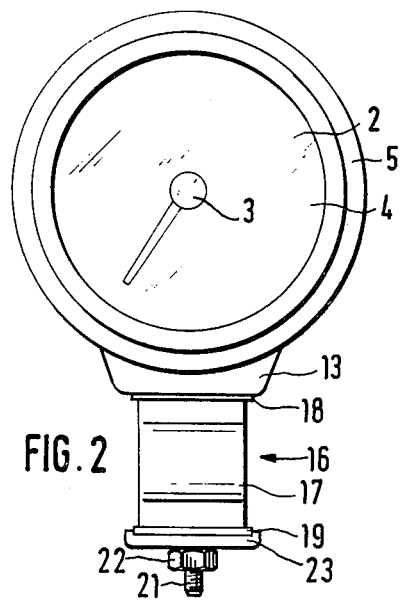
FIG. 2, illustrates a front view of the indicating instrument of FIG. 1.

The indicating instrument comprises a housing 1 wherein an electrical measuring mechanism with an instrument dial 2 and a hand 3 is contained. As shown on FIG. 2, the housing is closed in the front by an inspection glass 4 fastened by means of a front ring 5. At the rear end of the housing are provided two threaded bolts 6 and 7 holding a bridge 8 with a threaded hole 9 by two nuts.

The housing is mounted in a holding cup 10 by a screw 12 projecting through a hole 11 in the cup into the threaded hole of the bridge.

One side of the cup, preferably perpendicular to the dial, and designated to be adjacent to the vehicle, and hereinafter called the mounting side, is provided with a bulge 13 which has a plane surface 14 with an orifice 15. A vibration insulator 16 is fixed to this surface.

The vibration insulator has a ring or cylindrical portion 17 made from an elastic rubber material with a degree of Shore hardness between about 50 and 70, preferably about 60. The ring is provided on each of two opposite peripheral areas, preferably on lines parallel to the mounting side of the insulator, with a bearing surface 18 and 19, respectively. The cup-fastening bearing surface 18, which is adjacent to the cup, has a threaded hole into which a fastening screw 20 is screwed. The opposite bearing surface, which is the base-fastening surface, has a fastening screw 21, which, together with a nut 22, is fastened to a base 23. For this purpose the screw is preferably threaded. To the bearing surface of the base, which is constructed preferably as a supporting base, is fixed a clip or a clamp. In this structure the thread screw is constructed as a headless screw, projecting vertically from the bearing surface.

To prevent a relative rotation between holding cup 10 and vibration insulator 16, two parallel projections 24 and 25 are molded to the plane surface which abuts against the longitudinal edges of the cup fastening bearing surface.

The fixation of the vibration insulator on the holding cup may take place in various ways. In a particularly inexpensive manner, the ring is glued to the cup in the peripheral area radially opposite the bearing surface. Preferably the ring is prevulcanized to the cup in the peripheral area that is radially opposite the bearing surface. This results in a higher mechanical loading capacity. For a high mechanical loading capacity and simultaneously low costs, as the optimum fastening means, the ring is provided in the peripheral area radially opposite the bearing surface with a further bearing surface and a thread for fixing it to the cup. In this instance, for connection between the cup and the ring, the bearing surface adjacent the cup is provided with the internal thread and is provided in its periphery with the bulge having a plane surface which has a passage opening for the fastening screw.

In order to secure the connection between the cup and the ring against a relative rotation of the two parts to prevent a loosening of the screw connection, the plane surface preferably changes, at the side facing the ring, into at least one extension which abuts against the edge of the bearing surface of the ring.

Preferably the plane surface is arranged in the immediate area of the axis through center of gravity of the indicating instrument, which axis is perpendicular to the longitudinal axis of the cup to avoid pitching vibrations of the cup. For the same reason the degree of Shore hardness between 50 and 70 of the elastic rubber material was determined to be optimum. Comparative tests were made by the inventor and as a result the above specifications were determined to be optimum.

What is claimed is:

1. A vibration-eliminating mounting system for mounting an indicating instrument on a vibrating and shock-sustaining base, which may be part of a vehicle, particularly a motorcycle, comprising
    a holding cup for mounting the indicating instrument therein; and
    a block of elastic rubber material having cup-fastening and base fastening bearing surfaces disposed at opposite ends thereof, said cup-fastening bearing surface being secured to said holding cup and said base-fastening bearing surface being adapted to be secured to the vibrating and shock-sustaining base, said block of elastic rubber material including a portion between said opposite ends having a cylindrical configuration with a longitudinal axis extending transverse to a line intersecting said opposite ends and adapted to be disposed in substantially horizontal orientation whereby said block of elastic material isolates said holding cup from vibrations of the base.

2. A system according to claim 1 and further comprising a threaded element disposed at said base-fastening bearing surface for securing said block of elastic material to the base.

3. A system according to claim 2 and further comprising a second threaded element for securing said cup-fastening bearing surface to said holding cup.

4. A system according to claim 2 wherein said block of elastic material is prevulcanized to said holding cup at said cup-fastening bearing surface.

5. A system according to claim 2 wherein said block of elastic material is glued to said holding cup at said cup-fastening bearing surface.

6. A system according to claim 1 and further comprising a threaded element for fastening said cup-fastening bearing surface to said holding cup.

7. A system according to claim 6 wherein said cup-fastening bearing surface has an internally threaded portion and said holding cup is provided in a peripheral area with a bulge having a plane surface provided with an opening therein, said threaded element passing through said opening and threadedly engaging said threaded portion of said cup-fastening bearing surface to secure said cup-fastening bearing surface to said bulge.

8. A system according to claim 7 wherein said plane surface of said bulge is arranged in the immediate area of the axis through the center of gravity of the indicating instrument, which axis is perpendicular to the longitudinal axis of the holding cup and said longitudinal axis of said block of elastic rubber material.

9. A system according to claim 8 wherein said plane surface of said bulge extends on the side facing said block of elastic rubber material into at least one projection abutting against the edge of said cup-fastening bearing surface of said block of elastic rubber material.

10. A system according to claim 1 wherein said block of elastic material is formed of an elastic rubber material of a degree of Shore hardness between 50 and 70.

* * * * *